United States Patent [19]

Jackson

[11] Patent Number: 4,619,847
[45] Date of Patent: Oct. 28, 1986

[54] TRIM STRIP HAVING INJECTION MOLDED FINISHING PORTION AND METHOD OF MAKING

[75] Inventor: Norman C. Jackson, Livonia, Mich.

[73] Assignee: The Standard Products Company, Cleveland, Ohio

[21] Appl. No.: 589,931

[22] Filed: Mar. 20, 1984

[51] Int. Cl.⁴ .................. B60R 13/02; B29C 45/14
[52] U.S. Cl. .................................. 428/31; 264/138; 264/139; 264/248; 264/250; 264/259; 264/328.8; 264/328.12; 428/122; 428/172
[58] Field of Search ............... 264/DIG. 83, 328.12, 264/259, 250, 138, 139, 328.8, 248; 428/31, 122, 172

[56] References Cited

U.S. PATENT DOCUMENTS

| | | | |
|---|---|---|---|
| 3,451,709 | 6/1969 | Swauger | 293/1 |
| 3,711,360 | 1/1973 | Kent | 428/31 X |
| 3,843,475 | 10/1974 | Kent | 428/31 X |
| 3,914,482 | 10/1975 | Sawa et al. | 428/31 |
| 3,959,538 | 5/1976 | Loew | 428/31 |
| 3,970,498 | 7/1976 | Loew | 428/31 X |
| 4,083,592 | 4/1978 | Rubin et al. | 428/31 X |
| 4,160,052 | 7/1979 | Krysiak et al. | 428/31 |
| 4,174,986 | 11/1979 | Jennings | 156/160 |
| 4,318,764 | 3/1982 | Van Manen | 264/259 X |

FOREIGN PATENT DOCUMENTS

| | | | |
|---|---|---|---|
| 2240808 | 4/1975 | France | 264/259 |
| 58-12736 | 1/1983 | Japan | 264/250 |
| 58-167113 | 10/1983 | Japan | 264/259 |
| 58-211938 | 12/1983 | Japan | 428/31 |
| WO81/01263 | 5/1981 | PCT Int'l Appl. | 264/250 |

Primary Examiner—Philip Anderson
Attorney, Agent, or Firm—Harness, Dickey & Pierce

[57] ABSTRACT

A trim strip for an automobile or the like having a finished end made by cutting an end portion of the trim strip axially and transversely to form a projecting finger thereon and then injection molding a finishing end cap onto the projecting finger.

14 Claims, 8 Drawing Figures

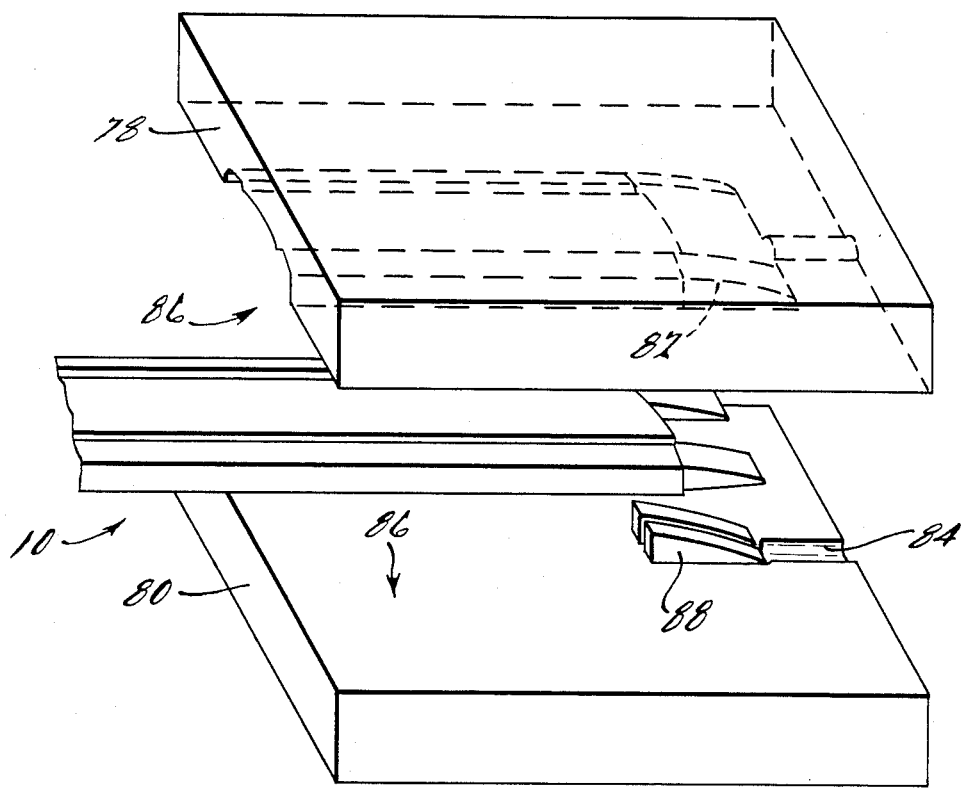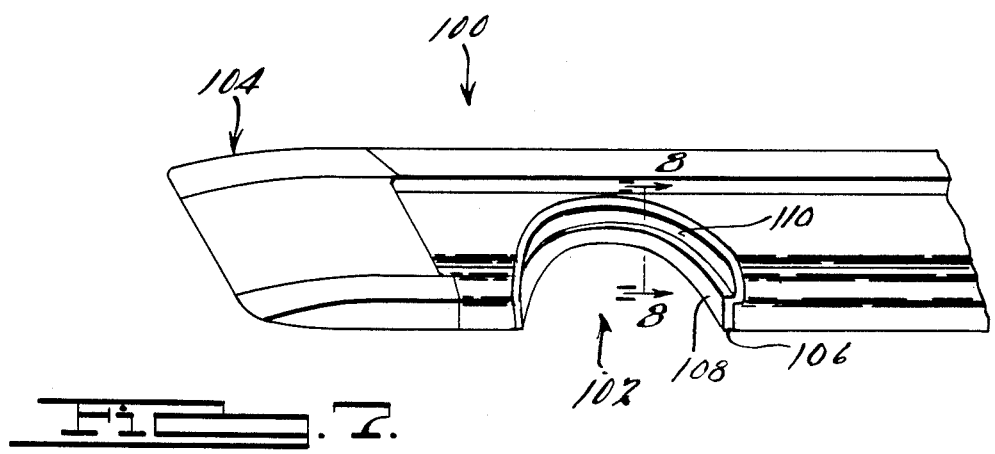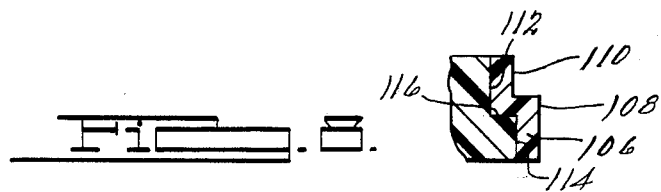

TRIM STRIP HAVING INJECTION MOLDED FINISHING PORTION AND METHOD OF MAKING

BACKGROUND AND SUMMARY OF THE INVENTION

This invention relates to trim strips having injection molded finishing portions and to their method of making. More particularly, this invention relates to finishing ends of trim strips and/or trim strips having injection molded cutout portions and to a method of making such trim strips. The present invention is especially applicable to trim strips having adhesive backing tape.

Trim strips are frequently used as protective and/or decorative accessories for motor vehicles, boats, aircraft, appliances, machines and other structures. For example, trim strips can be employed as body side molding on automobiles to provide impact protection from door strikes and also to enhance the aesthetic appeal of the automobile. Trim strips are generally formed by extruding thermoplastic material into elongated moldings which are then transversely cut to desired lengths. Considerable effort is often made to enhance the appearance of trim strips by, for example, embossing a portion of the surface of the trim strip or laminating a metallized film thereon.

Attention must also be given to finishing the ends of the trim strips and to finishing portions which are cutout, for example, to provide access to the key lock of a motor vehicle. Various methods and devices for dressing molding ends are disclosed in the prior art. For example, U.S. Pat. No. 3,451,709, June 24, 1969 to Swauger discloses the application of separately molded terminal end pieces which are press fit into the hollow core of an extruded trim strip. U.S. Pat. Nos. 4,174,986, Nov. 20, 1979 to Jennings and 3,959,538, May 25, 1976 to Lowell disclose methods involving cutting notches in the ends of trim strips and bonding remaining portions together. U.S. Pat. No. 4,160,052, July 3, 1979 to Krysiak, et al. discloses a method of forming a corner for a trim strip which includes cutting a V-shaped segment in a side edge of the trim strip. There remains, however, a need for an improved method for finishing trim strip ends and/or side cut portions.

Accordingly, the present invention relates to an improved method for finishing ends and/or cutout portions of trim strips and to the product made thereby. Terminal ends of various shapes can be employed. The present invention provides terminal ends which are well secured to the remaining trim strip portion and improves the appearance of end and/or cutout portions of trim strips. Furthermore, the present invention is particularly advantageous with trim strips having a decorative film such as metallized film thereon. Thus, at the terminal end of a trim strip of this invention no free edge of decorative film is presented to weather or corrosive material which would lead to deterioration of the appearance of the decorative film. The method of this invention is especially useful with respect to trim strips having adhesive backed tape or metal backing since the backing of the trim strip provides adhesive means for the finishing end.

In accordance with the method of this invention, an end portion of a trim strip is formed with at least one finger projecting therefrom. The end portion is then placed into an injection molding die wherein a finishing end cap is simultaneously injection molded and bonded to the end portion. A finishing edge can be formed on a cutout portion of the trim strip in an analogous manner. Further understanding of the benefits and advantages of the present invention will become apparent to those skilled in the art from the following description of the preferred embodiments of the invention taken in conjunction with the accompanying drawings.

BRIEF DESCRIPTION OF THE DRAWINGS

FIG. 4 is a perspective view of the trim strip end portion of FIG. 3 intermediate injection molding die halves.

FIG. 7 is a perspective view, broken away, of an alternative embodiment of this invention including a finished cutout trim strip edge.

FIG. 8 is a transverse cross-sectional view taken along 8—8 of FIG. 7.

DETAILED DESCRIPTION OF THE INVENTION

Figure 5:
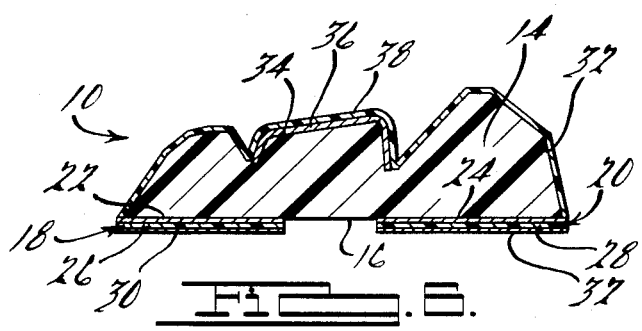
FIG. 5 is a top plan view, broken away, of a finished trim strip of the present invention.
Figure 6:
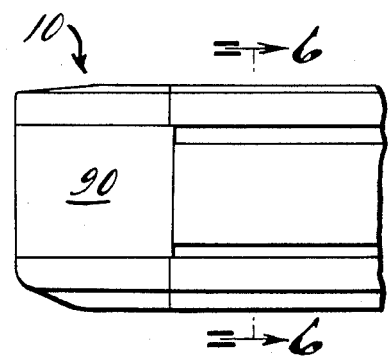
FIG. 6 is a transverse cross-sectional view of a finished trim strip of this invention taken along line 6—6 of FIG. 5.

Now referring to the Figures, the steps of the method of the present invention are illustrated in FIGS. 1–4. Generally speaking, in accordance with the present invention, a terminal finishing end cap and/or finishing edge is injection molded onto an unfinished end portion and/or cutout portion of a trim strip to provide a finished trim strip. A finished trim strip of the present invention is shown in FIGS. 5 and 6 and indicated generally by the numeral 10. Except for its end portion, trim strip 10 is of conventional construction and has an elongated body 14 made, for example, of an extruded thermoplastic such as polyvinyl chloride. Body 14 has a generally flat bottom surface 16 to which adhesive means for attaching body 14 to a structure surface are secured and indicated generally by numerals 18 and 20. Broadly speaking, the adhesive means can be any suitable means for attaching body 14 to a structure surface, such as conventional two-faced adhesive tape. Preferably, however, and as shown best in FIG. 6, adhesive means 18 and 20 are of analogous construction, each comprising aluminum foil 22 and 24 extending longitudinally along a portion of surface 16 and adhesively bonded thereto, foam strips 26 and 28 are adhesively secured to foil 22 and 24 respectively and release liners 30 and 32 cover an adhesive (not shown) on foam strips 26 and 28. The top surface 34 of body 12 can carry a metallized film 36 which is top coated with transparent polyvinyl chloride layer 38.

Figure 1:
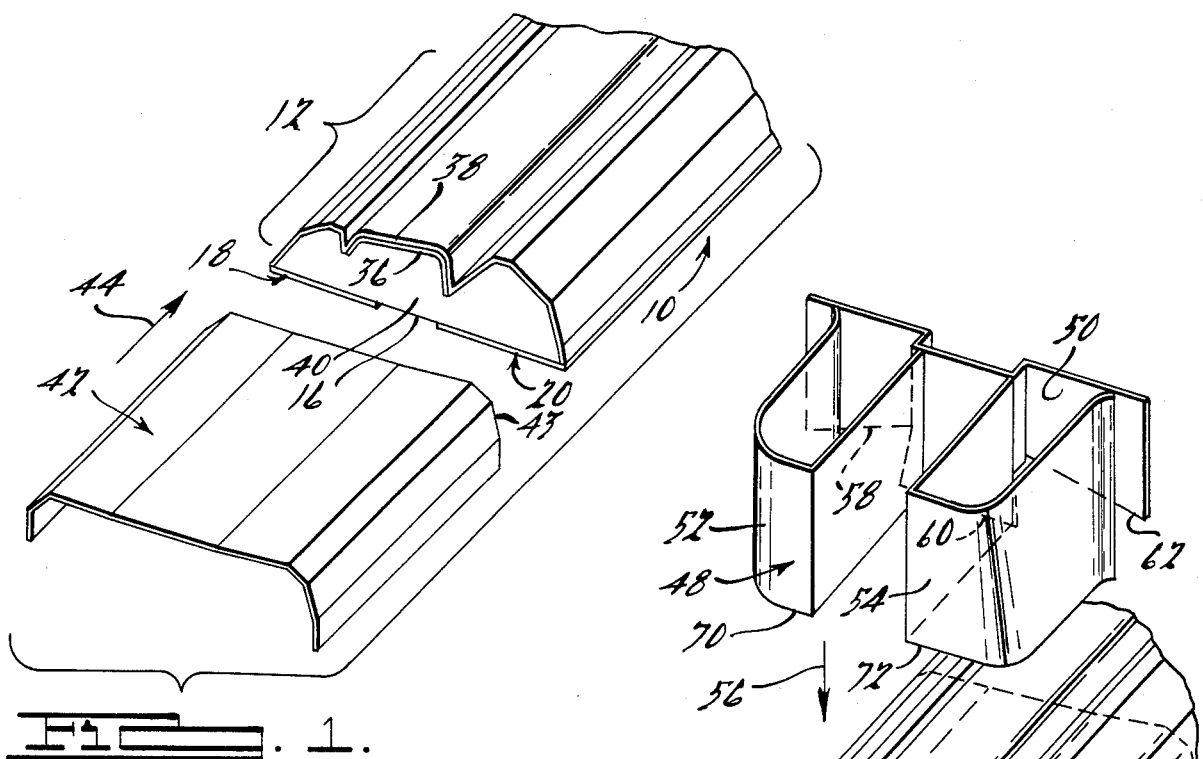
FIG. 1 is a perspective view of a trim strip end portion with an axial cutter adapted to make a longitudinally axially directed cut into the trim strip end portion.
Figure 2:
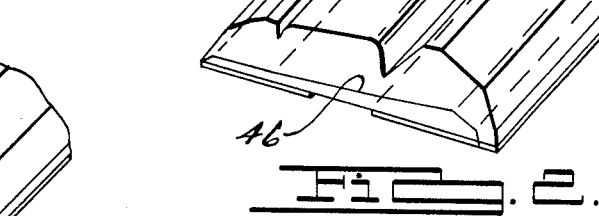
FIG. 2 is a perspective view of the trim strip end portion of FIG. 1 having been axially cut and a transverse die cutter adapted to cut into the trim strip end portion in a direction transverse to the longitudinal axis of the trim strip.

In accordance with the preferred process of this invention, an unfinished trim strip 10 is first cut to predetermined length in a conventional manner by a transverse end cut thereby forming an end portion 12 having transverse end wall 40 shown in FIG. 1. Then axial steel rule end die cutter 42, shown in FIG. 1, is caused to cut into end wall 40 in a direction indicated by arrow 44, generally parallel with the longitudinal axis of trim strip 10. Cutting edge 43 of end die cutter 42 is forced within trim strip 10 to a distance corresponding generally to the desired length of the finishing end cap and then is withdrawn. FIG. 2 shows the cut surface 46 formed by end die cutter 42. Cut surface 46 is preferably in the general form of an inverted "U" as shown by FIG. 2. Also, it may be desirable to incline cut 46 slightly from the longitudinal axis of trim strip 10 to provide fingers having relatively thin ends as shown best in FIG. 3.

Figure 3:
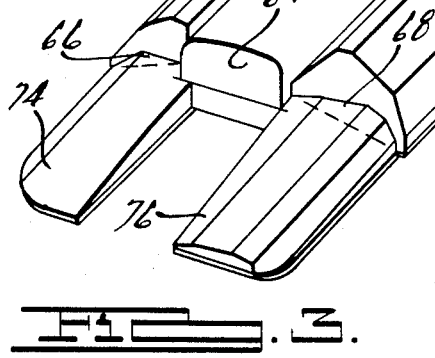
FIG. 3 is a perspective view of the trim strip end portion of FIG. 2 having been axially and transversely cut.

Now referring to FIG. 2, transverse die cutter 48 is next caused to cut end portion 12 of trim strip 10 to form or shape the end portion as shown in FIG. 3. Transverse die cutter 48 includes three cutting blade members, end cutter member 50 and a pair of finger forming cutter members 52 and 54. Transverse die cutter 48 is caused to stroke transversely into end portion 12 of trim strip 10 in the direction indicated by arrow 56. Cutting edges 58, 60 and 62 of end cutter member 50 intersect cut surface 46 formed by end die cutter 42 to form end wall 64 which has over cut portions 66 and 68 as a result of the angle of cutting edges 58 and 62 so that material from end portion 12 of trim strip 10 is easily removable. Simultaneously, cutting edges 70 and 72 of finger forming cutter members 52 and 54 cut fingers 74 and 76, respectively, thus producing the configuration of the trim strip shown by FIG. 3 having tapered fingers 74 and 76.

Now referring to FIG. 4, end portion 12 of trim strip 10 is next loaded into an injection molding die having upper and lower die portions 78 and 80. Die portions 78 and 80 cooperate to form an end cavity 82 which communicates to an outside edge of the die by sprue channel 84. Die portions 78 and 80 further form an elongated clamping section 86 which, when die portions 78 and 80 are clamped together, securely clamps end portion 12 of trim strip 10 in position within the die. Locating means 88 are provided to locate end wall 64 of end portion 12 of trim strip 10 within end cavity 82. Once the die portions 78 and 80 are firmly clamped together, heated thermoplastic material such as polyvinyl chloride is injected through sprue channel 84 under pressure into end cavity 82. End portion 12 of trim strip 10 is preferably made of a thermoplastic material which softens at the temperature of the injected thermoplastic material so that both materials fuse or bond. Of course, an adhesive promoter such as a solvent for the thermoplastic materials can be applied to contacting surfaces of end portion 12 to enhance bonding of the injected thermoplastic thereto. After a predetermined cooling duration, die portions 78 and 80 are separated and the completed finished end is removed. By this process, a finished end 90 is molded in situ, thus simultaneously forming and bonding the end onto end portion 12 of trim strip 10.

A completed trim strip 10 is shown by FIGS. 5 and 6 having finished end portion 90. Finished end portion 90 is securely bonded to the remainder of trim strip 10 and further overlaps the central portion of trim strip 10. Metallized film 36 on trim strip 10 is sealed and protected from the environment. Of course, since the configuration of finished end portion 90 depends only on the end cavity 82 shape, the invention provides designers wide latitude in the designing of such end portions.

FIGS. 7 and 8 illustrate an alternative embodiment, trim strip 100, of the present invention wherein a finishing treatment is provided for a cutout portion 102 as well as an end portion 104 of the trim strip 100. Cutout portions such as cutout portion 102 are often provided to prevent trim strip 100 from interfering with the normal functions of the devices to which they are attached. For example, such cutouts may be provided to permit insertion of a lock key within a motor vehicle doorlock.

It will be appreciated that trim strip 100 can be made in a manner analogous to that of trim strip 10. Thus, cutout portion 102 is made by a side cutter presenting a semi-circular blade in top plan view and a transverse cutter analogous to that of FIG. 2 but having two cutter blades in concentric relationship, in top plan view, one blade adapted to cut wall 112 and another adapted to cut wall 114 to form a step-like configuration in conjunction with wall 116 formed by the side cutter. After being cut, cutout portion 102 is loaded into an injection molding die as previously described but having a cavity shaped to provide trim edge 106. Optionally, finished end 104 can be molded simultaneously with edge 106 so that thermoplastic material is injected into a suitably shaped injection mold to form a finished end in situ as well as a finished edge.

While the above description constitutes the preferred embodiment of the present invention, it will be appreciated that the invention is susceptible to modification, variation and change without departing from the proper scope and fair meaning of the accompanying claims.

What is claimed is:

1. A trim strip having a finished end made by:
   providing a trim strip;
   cutting an end portion of said trim strip in an axial direction using an end die cutter;
   cutting said end portion of said trim strip in a transverse direction to form a least one projecting finger using a transverse die cutter;
   placing said projecting finger of said end portion of said trim strip into an injection molding die having an internal cavity and clamping said trim strip end portion into said injection molding die;
   injecting thermoplastic material within said cavity of said die such that said material contacts and bonds to said finger and forms an end cap thereover; and
   withdrawing the finished trim strip from said die.

2. A trim strip according to claim 1 wherein said end die cutter forms the shape of an inverted "U".

3. A trim strip according to claim 1 wherein a pair of protruding fingers are formed.

4. A trim strip according to claim 3 wherein said trim strip further comprises adhesive means in the form of a strip attached to the bottom surface of said trim strip and said fingers.

5. A trim strip according to claim 3 wherein said transverse die cutter includes an end cutter member with a center section which cuts completely through the sections of said trim strip between said fingers and a pair of sections which cut partially into said fingers.

6. A trim strip according to claim 5 wherein said transverse die cutter further comprises a pair of fingers forming members which cut completely through said trim strip thereby forming said fingers.

7. A trim strip according to claim 6 wherein said transverse die cutter fingers forming members are connected to said end cutter member.

8. A trim strip according to claim 5 wherein said transverse cutter end cutter member produces a cut along more than one plane such that said region between said fingers extends longitudinally beyond the portion of said transverse cut which extends into said finger and said cavity is shaped such that said region between said fingers becomes completely encased when said thermoplastic material is injected into said cavity.

9. A process for finishing the end of a trim strip comprising the steps of:
providing a trim strip;
cutting an end portion of said trim strip in an axial direction;
cutting said end portion of said trim strip in a transverse direction to form at least one projecting finger;
placing said projecting finger of said end portion of said trim strip into an injection molding die having an internal cavity and clamping said trim strip end portion in said injection molding die;
injecting thermoplastic material within said cavity of said die such that said material contacts and bonds to said finger and forms an end cap thereover; and
withdrawing the finished trim strip from said die.

10. The process according to claim 9 wherein said cutting forms a pair of protruding fingers.

11. A process for finishing the end of a trim strip comprising the steps of:
providing a trim strip having adhesive means in the form of a strip attached to the bottom surface of said trim strip;
cutting an end portion of said trim strip in an axial direction;
cutting said end portion of said trim strip in a transverse direction to form at least one projecting finger, said finger having adhesive means attached to the bottom surface of said finger;
placing said projecting finger of said end portion of said trim strip into an injection molding die having an internal cavity and clamping said trim strip end portion in said injection molding die;
injecting thermoplastic material within said cavity of said die such that said material contacts and bonds to said finger and forms an end cap thereover; and
withdrawing the finished trim strip from said die.

12. The process according to claim 9 wherein said axial cutting forms a cut in the shape of an inverted "U".

13. The process according to claim 10 wherein said transverse cutting cuts completely through said trim strip in the region between said fingers and partially through said fingers.

14. The process according to claim 12 wherein said transverse cutting produces a cut along more than one plane such that said region between said fingers extends longitudinally beyond the portion of said transverse cut which extends into said finger and said cavity is shaped such that said region between said fingers becomes completely encased when said thermoplastic material is injected into said cavity.

* * * * *